(12) United States Patent
Kumagai

(10) Patent No.: US 9,367,200 B2
(45) Date of Patent: Jun. 14, 2016

(54) INFORMATION PROCESSING DEVICE, METHOD FOR CONTROLLING INFORMATION PROCESSING DEVICE, PROGRAM AND INFORMATION RECORDING MEDIUM

(75) Inventor: Tomoharu Kumagai, Tokyo (JP)

(73) Assignee: RAKUTEN, INC., Tokyo (JP)

( * ) Notice: Subject to any disclaimer, the term of this patent is extended or adjusted under 35 U.S.C. 154(b) by 224 days.

(21) Appl. No.: 14/235,445

(22) PCT Filed: May 29, 2012

(86) PCT No.: PCT/JP2012/063802
§ 371 (c)(1),
(2), (4) Date: Jan. 27, 2014

(87) PCT Pub. No.: WO2013/018427
PCT Pub. Date: Feb. 7, 2013

(65) Prior Publication Data
US 2014/0208264 A1 Jul. 24, 2014

(30) Foreign Application Priority Data

Jul. 29, 2011 (JP) .................. 2011-167821

(51) Int. Cl.
*G06F 3/0485* (2013.01)
*G06F 3/0481* (2013.01)
(Continued)

(52) U.S. Cl.
CPC ................ *G06F 3/0481* (2013.01); *G06F 3/14* (2013.01); *G09G 5/14* (2013.01); *G09G 5/377* (2013.01);
(Continued)

(58) Field of Classification Search
None
See application file for complete search history.

(56) References Cited

U.S. PATENT DOCUMENTS 4,769,636 A * 9/1988 Iwami ...................... G09G 5/14
715/790
5,572,647 A * 11/1996 Blades .................. G06F 3/0481
715/798

(Continued)

FOREIGN PATENT DOCUMENTS

CN 101315603 A 12/2008
EP 1589414 A2 10/2005
(Continued)

OTHER PUBLICATIONS

International Search Report for PCT/JP2012/063802 dated Sep. 4, 2012.

(Continued)

*Primary Examiner* — Jeffrey A Gaffin
*Assistant Examiner* — Nhat-Huy T Nguyen
(74) *Attorney, Agent, or Firm* — Hubbs, Enatsky & Inoue PLLC

(57) ABSTRACT

A focus part of an object is displayed in an actual display area, which is a part of a display target area set within a window that is visible on a screen, without changing the size of the focus part and the layout of the display object. A control unit sets a reference point P based on the positions of a display element and the actual display area in a drawing target area (22), in which a Web page is drawn, so that the display element is displayed in the actual display area, which is an area not covered with another window (16a) within a Web page display target area (20). For example, the control unit (a) displays the display element without changing the size and (b) minimizes a blank area that is created when the reference point P is moved, or (c) preferentially displays, from among a plurality of display elements, display elements that are relatively high in priority order in the actual display area.

10 Claims, 15 Drawing Sheets

(51) Int. Cl.
  *G06F 3/14* (2006.01)
  *G09G 5/377* (2006.01)
  *G09G 5/14* (2006.01)

(52) U.S. Cl.
  CPC .... *G09G 2340/0464* (2013.01); *G09G 2340/12* (2013.01); *G09G 2354/00* (2013.01); *G09G 2370/027* (2013.01)

(56) References Cited

U.S. PATENT DOCUMENTS

| | | | | |
|---|---|---|---|---|
| 5,751,283 | A * | 5/1998 | Smith | G06F 3/0481 345/660 |
| 6,983,331 | B1 * | 1/2006 | Mitchell | G06F 17/30905 707/E17.121 |
| 2004/0196273 | A1 | 10/2004 | Mitsumura et al. | |
| 2007/0050729 | A1 | 3/2007 | Kawamura et al. | |
| 2008/0158144 | A1 * | 7/2008 | Schobben | G06F 1/3203 345/156 |
| 2008/0270934 | A1 * | 10/2008 | Firebaugh | G06F 3/0485 715/784 |
| 2008/0301577 | A1 | 12/2008 | Onda et al. | |
| 2009/0024956 | A1 * | 1/2009 | Kobayashi | G06F 3/0481 715/784 |
| 2009/0319942 | A1 * | 12/2009 | Delia | G06F 9/4443 715/785 |
| 2009/0327952 | A1 * | 12/2009 | Karas | G06F 3/0485 715/786 |
| 2012/0102430 | A1 * | 4/2012 | Kobayashi | G06F 3/0481 715/784 |

FOREIGN PATENT DOCUMENTS

| | | |
|---|---|---|
| JP | 10-011263 A | 1/1998 |
| JP | 10-200873 A | 7/1998 |
| JP | 2004-271866 A | 9/2004 |
| JP | 2004-302124 A | 10/2004 |
| JP | 2007-065356 A | 3/2007 |

OTHER PUBLICATIONS

Office action for corresponding Japanese Patent Application No. 2011-167821 dated Dec. 3, 2013.

English Translation of Written Opinion of the International Searching Authority for PCT/JP2012/063802 accompanied with PCT/IB/373 and PCT/IB/338 dated Feb. 13, 2014, acting as concise explanation of previously submitted reference(s).

* cited by examiner

| WINDOW | POSITION OF UPPER LEFT CORNER | SIZE (HEIGHT, WIDTH) | PRIORITY ORDER |
|---|---|---|---|
| WINDOW A | $(x_a, y_a)$ | $(H_a, W_a)$ | 1 |
| WINDOW B | $(x_b, y_b)$ | $(H_b, W_b)$ | 2 |
| ⋮ | ⋮ | ⋮ | ⋮ |

INFORMATION PROCESSING DEVICE, METHOD FOR CONTROLLING INFORMATION PROCESSING DEVICE, PROGRAM AND INFORMATION RECORDING MEDIUM

CROSS REFERENCE TO RELATED APPLICATIONS

This application is a National Stage of International Application No. PCT/JP2012/063802 filed May 29, 2012, claiming priority based on Japanese Patent Application No. 2011-167821 filed on Jul. 29, 2011. The contents of each of the above documents are incorporated herein by reference in their entirety.

TECHNICAL FIELD

The present invention relates to an information processing device, a method of controlling an information processing device, a program, and an information recording medium.

BACKGROUND ART

Display elements disposed in a part of a display target area set within a window that is not displayed on the screen and therefore is not visible cannot be viewed on the screen. The following patent literature deals with this and describes, when a part of a display target area is not visible, displaying a cursor position of text disposed in the part of the display target area that is not visible in a visible part of the window by scrolling processing while shrinking the display target area (see FIG. 13 of Patent Literature 1, for example).

CITATION LIST

Patent Literature

[Patent Literature 1] JP 10-11263 A

SUMMARY OF INVENTION

Technical Problems

In the patent literature, the cursor position is moved by scrolling in a given direction irrespective of the shape of an actually displayed part, which is a part of the display target area that is visible on the screen. a position where the text that was in the non-visible part is displayed in the actually displayed part is practically limited for that reason. Therefore, in the case of displaying a display element that was disposed in a non-visible part, for example, an image or a table, in the actually displayed part, the display element cannot be displayed in the actually displayed part if there is no sufficient space at the display position in the actual display area, unless the size of the display element is changed (e.g., reduced).

In addition, the technology of the patent literature reduces the size of the display target area in a given direction when the display target area becomes partially hidden from view. The layout of the display element consequently falls apart depending on the direction in which the text is written.

An object of the present invention is to display a focus part of a display object in an actual display area, which is a part of a display target area set within a window that is visible on the screen, without changing the size of the focus part and the layout of the display object.

Solution to Problems

In order to solve the above-mentioned problems, an information processing device according to the present invention includes: obtaining means for obtaining a position in a display target area, which is within a window, of a focus part of an object that is drawn in the display target area or that is to be drawn in the display target area; identifying means for identifying an actual display area, which is a part of the display target area that is visible on a screen; and setting means for setting a position where the object is drawn so that the focus part is displayed in the actual display area, based on the obtained position of the focus part and the identified actual display area. Examples of the object include a document object (e.g., a Web page) and an image object (e.g., an electronic map). The focus part is, for example, an item among contents (e.g., text, a link, and an image) disposed within a document object, or an at least partial area of the document object, or a point within an image object or an at least partial area of an image object. The object can be drawn in a drawing target area, which is, for example, at least a part of the display target area and which is defined by a reference point within the display target area. The setting means in this case sets the reference point based on the position of the focus part and the identified actual display area.

Further, in order to solve the above-mentioned problems, a method of controlling an information processing device according to the present invention includes: an obtaining step of obtaining a position in a display target area, which is within a window, of a focus part of an object that is drawn in the display target area or that is to be drawn in the display target area; an identifying step of identifying an actual display area, which is a part of the display target area that is visible on a screen; and a setting step of setting a position where the object is drawn so that the focus part is displayed in the actual display area, based on the obtained position of the focus part and the identified actual display area.

Further, in order to solve the above-mentioned problems, a program according to the present invention causes a computer to function as: obtaining means for obtaining a position in a display target area, which is within a window, of a focus part of an object that is drawn in the display target area or that is to be drawn in the display target area; identifying means for identifying an actual display area, which is a part of the display target area that is visible on a screen; and setting means for setting a position where the object is drawn so that the focus part is displayed in the actual display area, based on the obtained position of the focus part and the identified actual display area.

Further, the computer-readable information recording medium of the present invention is a computer-readable information recording medium having the above-mentioned program recorded thereon.

According to the present invention, where the object is drawn is set based on the position of a focus part and the actual display area, and the focus part of the object can therefore be displayed in the actual display area without changing the size of the focus part and the layout of the object.

In an aspect of the present invention, a position where the object is drawn may be set "when it is determined that a position of the focus part is not contained in the actual display area due to the position of the window in the screen". In other words, a position where the object is drawn may not be set "when it is determined that a position of the focus part is not contained in the actual display area for other reasons than the position of the window". "When it is determined that a position of the focus part is not contained in the actual display area due to the position of the window in the screen" is, for example, "when it is determined that, because another window is partially overlaid on the window in question, a position of the focus part is not contained in a part of the display target area where the other window is not overlaid (i.e., the actual display area)" or "when it is determined that, because a part of the window is not within the screen, the position of the focus part is not contained in a part of the display target area that is within the screen (i.e., the actual display area)". "When it is determined that the position of the focus part is not contained in the actual display area for other reasons than the position of the window" is, for example, "when it is determined that the position of the focus part is not contained in the display target area (i.e., the actual display area) as a result of scrolling". This way, a position where the object is drawn is not set when, for example, it is determined that the position of the focus part is not contained in the actual display area as a result of scrolling, and the focus part of the object can therefore be displayed in the actual display area while avoiding irritating the user.

According to an aspect of the present invention, the obtaining means may obtain, for each of a plurality of positions within the display target area, a position where the focus part is positioned in the display target area in a case where each of the plurality of positions is set as the reference point, the information processing device may further include exposure amount evaluating means for evaluating, for each of the plurality of positions, an amount of exposure of the focus part in the actual display area in a case where each of the plurality of positions is set as the reference point, based on the position obtained by the obtaining means for each of the plurality of positions, and the setting means may set the reference point based on an evaluation result obtained by the exposure amount evaluating means for each of the plurality of positions. This way, the amount of exposure of the focus part in the actual display area can be taken into account when setting the reference point. For instance, this enables the information processing device to set the reference point according to which a given proportion of the focus part is displayed.

Further, according to an aspect of the present invention, the information processing device may further include blank area evaluating means for evaluating, for each of the plurality of positions, an amount of a blank area that is generated in a case where each of the plurality of positions is set as the reference point, based on each of the plurality of positions, and the setting means may set the reference point based on evaluation results obtained by the exposure amount evaluating means and the blank area evaluating means for each of the plurality of positions. This way, the blank area that is generated by setting the reference point can be taken into account when setting the reference point. For instance, this enables the information processing device to set the reference point that minimizes the blank area.

Further, according to an aspect of the present invention, the object may include a plurality of the focus parts, the obtaining means may obtain, for each of the plurality of positions, positions where each focus part is positioned in the display target area in a case where each of the plurality of positions is set as the reference point, the exposure amount evaluating means may evaluate, for each of the plurality of positions, the amount of exposure of each of focus part in a case where each of the plurality of positions is set as the reference point, and the setting means may set the reference point based on the evaluation result of the exposure amount of each focus part obtained for each of the plurality of positions. This way, the amount of exposure of the focus part in the actual display area can be taken into account when setting the reference point. For instance, this enables the information processing device to set the reference point with which as many focus display elements as possible can be displayed in the actual display area.

Further, according to an aspect of the present invention, a place in priority order may be set to each focus part, and the setting means may set the reference point based on the evaluation result of the exposure amount of each focus part obtained for each of the plurality of positions, and on the place in priority order of each focus part. This way, the order of priority of each focus parts can be taken into account when setting the reference point. For instance, this enables the information processing device to preferentially display focus parts that are high in priority order.

Further, according to an aspect of the present invention, the object may include a plurality of the focus parts, to each of which a place in priority order is set, the information processing device may further include selecting means for selecting one of the plurality of the focus parts based on the priority order, the obtaining means may obtain, for each of the plurality of positions, a position where the selected one of the plurality of the focus parts is positioned in the display target area in a case where each of the plurality of positions is set as the reference point, and the exposure amount evaluating means may evaluate, for each of the plurality of positions, an amount of exposure of the selected one of the plurality of the focus parts in a case where each of the plurality of positions is set as the reference point, based on the position obtained by the obtaining means for the each of the plurality of positions. In this way, too, the order of priority of the focus parts can be taken into account when setting the reference point. For instance, this enables the information processing device to preferentially display focus parts that are high in priority order.

Further, according to an aspect of the present invention, when an evaluation result obtained for each of the plurality of positions satisfies a given condition, the selecting means may restrict the setting of the reference point, which is performed by the setting means based on the evaluation result, and select another focus point anew based on the priority order. This way, which one of the focus parts is to be paid attention to can be switched in an order based on the order of priority when, for example, the reference point is set.

Further, according to an aspect of the present invention, the information processing device may assign a lower place in the priority order to the focus part that is displayed in the display target area when the setting means sets the reference point, in a case where the setting means sets the reference point to other positions than an initial position of the reference point. This enables the information processing device to, for example, avoid keeping displaying only a particular focus part in the actual display area.

DESCRIPTION OF EMBODIMENT

An exemplary embodiment of the present invention is described below with reference to the drawings.

Figure 1:
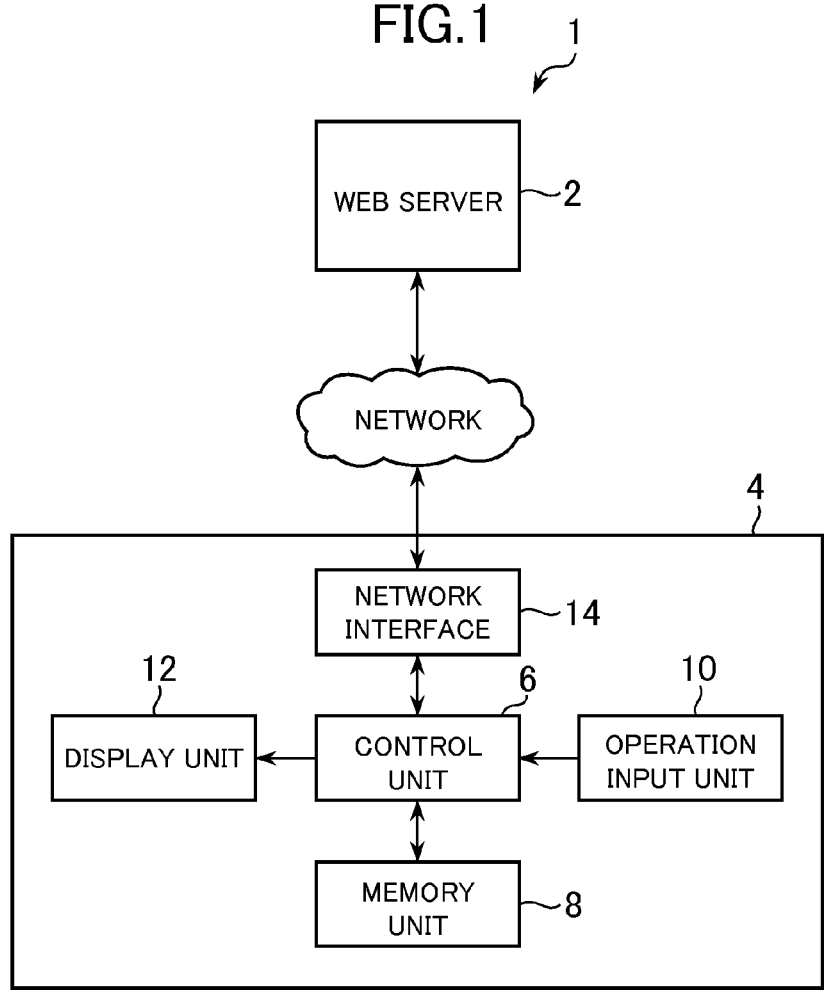
FIG. 1 is a diagram illustrating the configuration of a service providing system.

FIG. 1 is a diagram illustrating the configuration of a service providing system 1. As illustrated in FIG. 1, the service providing system 1 includes a client personal computer 4 of a user (hereinafter referred to as client PC 4) and a Web server 2 of an Internet service provider. The Web server 2 is a server that is used by the service provider to provide its service to the user. The client PC 4 and the Web server 2 can hold communication to/from each other over a network.

The client PC 4 includes a control unit 6, a memory unit 8, an operation input unit 10, a display unit 12, and a network interface (hereinafter referred to as network IF 14).

The control unit 6 is a microprocessor and performs various types of information processing as programmed by programs that are stored in the memory unit 8. The memory unit 8 stores data that is needed by the control unit 6 in the process of information processing. The memory unit 8 also stores a plurality of applications including an operating system and a browser application (program). These applications may be read out of a computer-readable information storing medium such as a DVD (registered trademark)-ROM, or may be supplied from a communication network such as a network, to be stored in the memory unit 8.

The operation input unit 10 is a mouse and a keyboard, or the like, and outputs an operation signal which indicates the specifics of operation made by the user to the control unit 6. The display unit 12 is, for example, a liquid crystal display, and displays information output from the control unit 6 on a screen. The network IF 14 is a communication interface for connecting the client PC 4 to the network.

The user uses the browser application to display Web data distributed by the Web server 2 in a browser window as a Web page (object (document object)). The Web data is data written in a markup language, here, HyperText Markup Language (HTML) data. The Web data which is distributed by the Web server 2 to be provided to the client PC 4 here may be read out of a computer-readable information storing medium such as a DVD (registered trademark)-ROM that is provided by the service provider.

Figure 2:
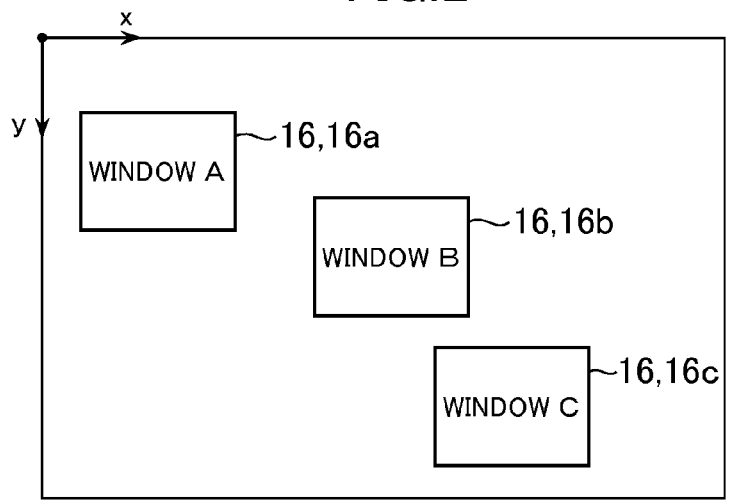
FIG. 2 is a diagram illustrating an example of contents displayed on a screen.

FIG. 2 is a diagram illustrating an example of what is displayed on the screen. As illustrated in FIG. 2, the screen displays windows 16 of the respective applications. Specifically, a window 16a, a window 16b, and a window 16c are displayed. These windows 16 are allocated to applications by the operating system when the applications are activated, and are managed by the operating system. An xy coordinate system is set on the screen with the upper left vertex of the screen as the origin. An arbitrary position within the screen is expressed by coordinate values of the xy coordinate system.

The window 16a, the window 16b, and the window 16c are hereinafter referred to as window A, window B, and window C, respectively. The window B (window) is a window of the browser application here.

Figures 3, 4:
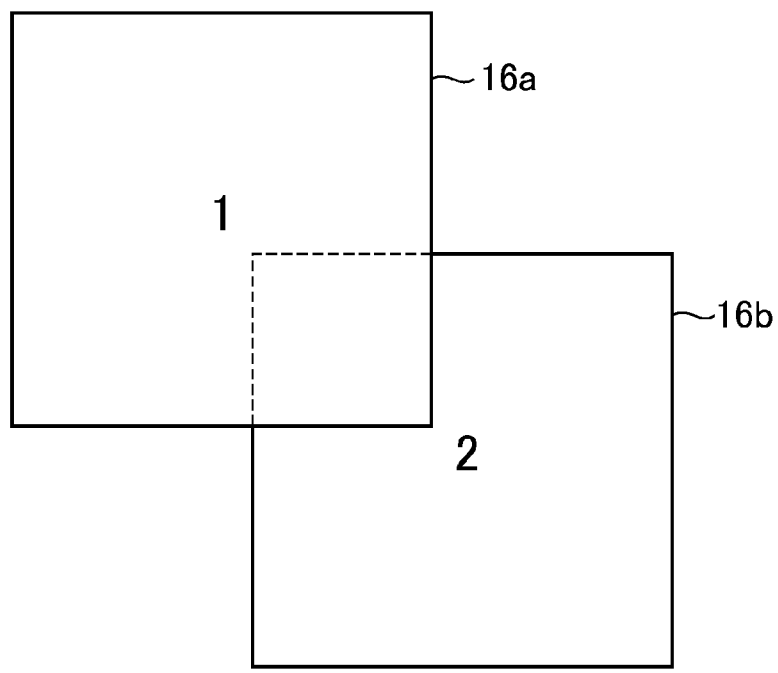
FIG. 3 is a diagram illustrating an example of a window management table.
FIG. 4 is a diagram illustrating another example of what is displayed on the screen.

FIG. 3 is a diagram illustrating an example of a window management table, which is used by the operating system to manage windows. The window management table is stored in the memory unit 8. As illustrated in FIG. 3, the window management table stores, for each window, coordinate values of an xy coordinate system that indicate the position of the upper left vertex of the window. When the user moves a window, the operating system updates the coordinate values. The window management table also stores, for each window, the size of the window, namely, the height and the width. An area occupied by a window on the screen is indicated by the position of the upper left vertex of the window and the size of the window.

The window management table stores for each window a place in priority order as well. The operating system draws windows starting from windows that are low in the order of priority. Accordingly, when apart of one window overlaps with another window which is higher in priority order than the window in question, that part is covered with the other window. FIG. 4 illustrates another example of what is displayed on the screen in which the window B whose place in priority order is "2" overlaps with the window A whose place in priority order is "1".

When the user operates one of the windows, the operating system updates the place in priority order of this window to "1", and moves other windows that have been high in priority order relative to this window one step down in the order of priority as a rule.

The window B which is a window of the browser application is described next.

Figure 5:
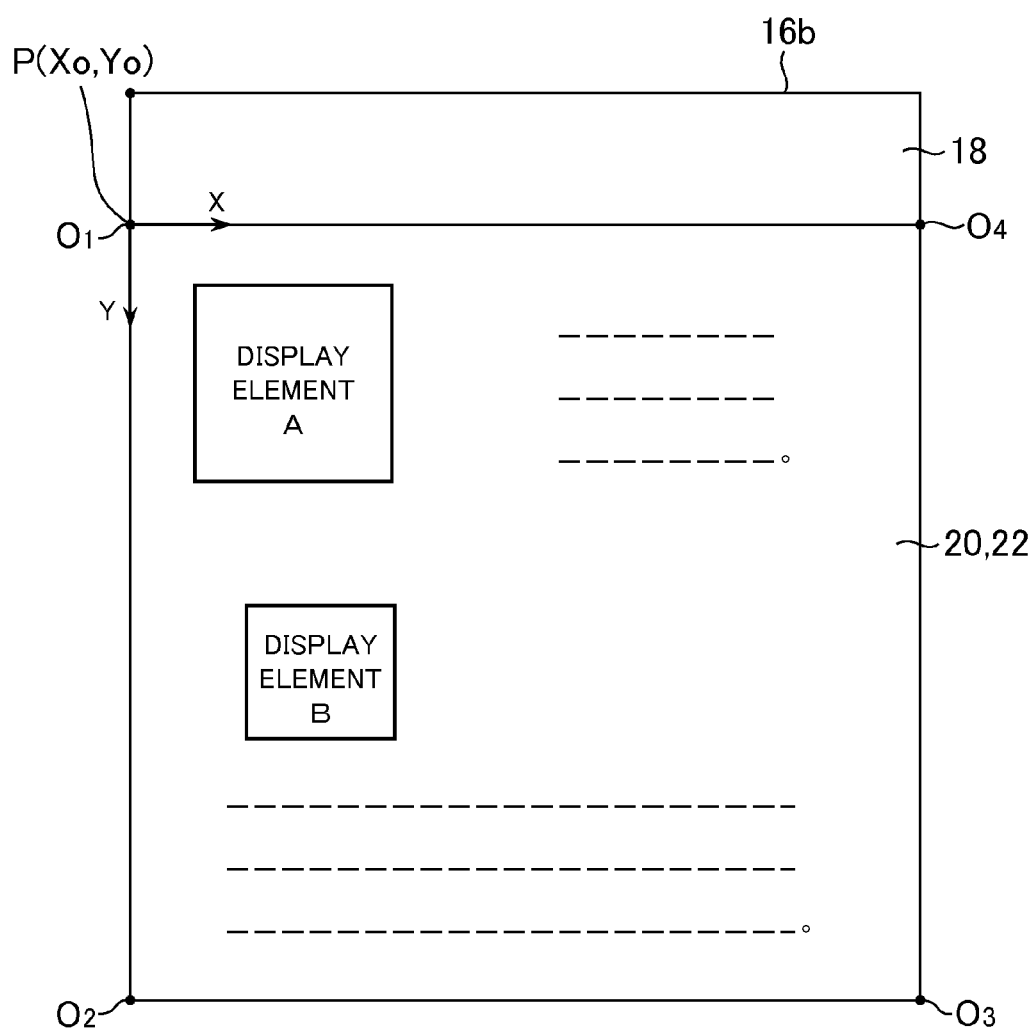
FIG. 5 is a diagram illustrating an example of a window B.

FIG. 5 is a diagram illustrating an example of the window B. As illustrated in FIG. 5, the window B has a rectangular shape and includes a bar area 18 and a Web page display target area 20 (display target area).

The bar area 18 is a rectangular-shaped area having as its vertices the upper left vertex of the window B, a point $O_1$, a point $O_4$, and the upper right vertex of the window B, and displays, for example, a title bar, a menu bar, and an address bar. The positions of the point $O_1$ and the point $O_4$ in the window B are set suitably in relation to the window size by the browser application.

The Web page display target area 20 is an area contained in the window B as described above, in this embodiment, a rectangular-shaped area having as its vertices the point $O_1$, the lower left vertex of the window B which is denoted by $O_2$, the lower right vertex of the window B which is denoted by $O_3$, and the point $O_4$. An XY coordinate system having the point $O_1$ as the origin is set in the window B. An arbitrary position within the Web page display target area 20 is expressed by XY coordinate values of the XY coordinate system.

A drawing target area 22 (drawing target area) is set in at least a part of the Web page display target area 20. The drawing target area 22 is a rectangular-shaped area having, as its upper left vertex, a reference point P which is at a position within the Web page display target area 20, and the point $O_3$ as its lower right vertex. A Web page containing a plurality of display elements is drawn in the drawing target area 22. The reference point P defines the drawing target area 22. A position where a Web page is drawn is therefore determined by the reference point P. The display elements are an image, text, a video, and the like, here a banner image which takes up a part of a Web page. The Web page here contains a display element A and a display element B. The service provider here recognizes the display element A as a display element that is the first in display priority order and recognizes the display element B as a display element that is the second in display priority order.

The reference point P defines a margin between the Web page display target area 20 and the drawing target area 22. Specifically, an X-coordinate value "$X_0$" of the reference point P defines the left margin width between the Web page display target area 20 and the drawing target area 22, and a Y-coordinate value "$Y_0$" of the reference point P defines the upper margin width. The margin reference point P is set at the point $O_1$ in FIG. 5. In short, $X_0$ and $Y_0$ are both "0". The Web page display target area 20 and the drawing target area 22 accordingly coincide with each other. The X-coordinate value "$X_0$" of the reference point P may instead define the right margin width between the Web page display target area 20 and the drawing target area 22, and the Y-coordinate value "$Y_0$" of the reference point P may instead define the lower margin width. Here, the X-coordinate value "$X_0$" of the reference point P defines the left margin width between the Web page display target area 20 and the drawing target area 22, and the Y-coordinate value "$Y_0$" of the reference point P defines the upper margin width as described above.

Figure 6:
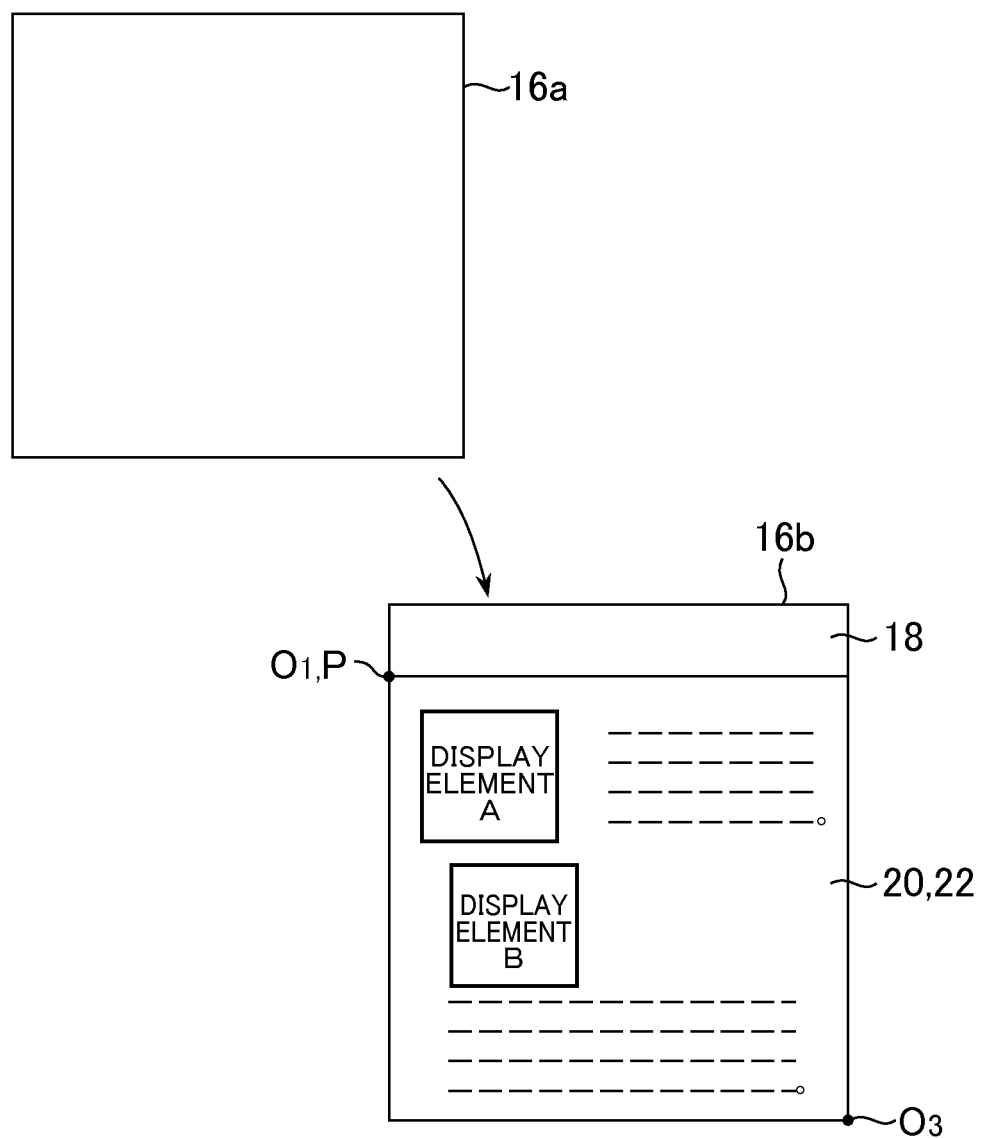
FIG. 6 is a diagram illustrating a transition of what is displayed on the screen.
Figure 7A:
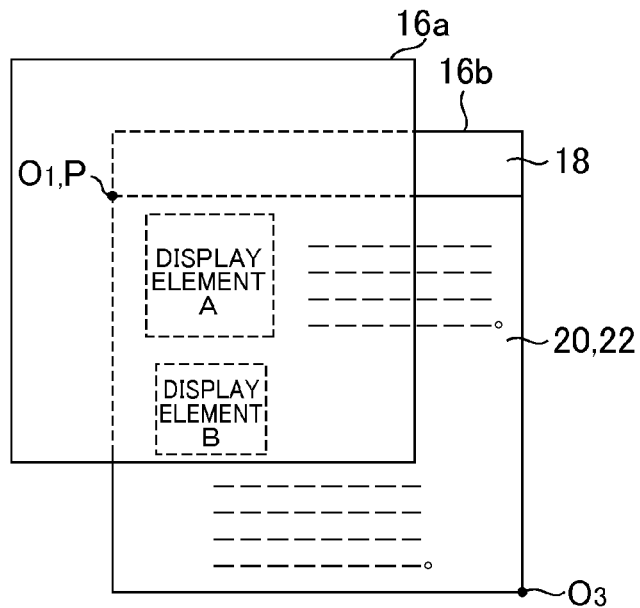
FIG. 7A is a diagram illustrating a transition of what is displayed on the screen.
Figure 7B:
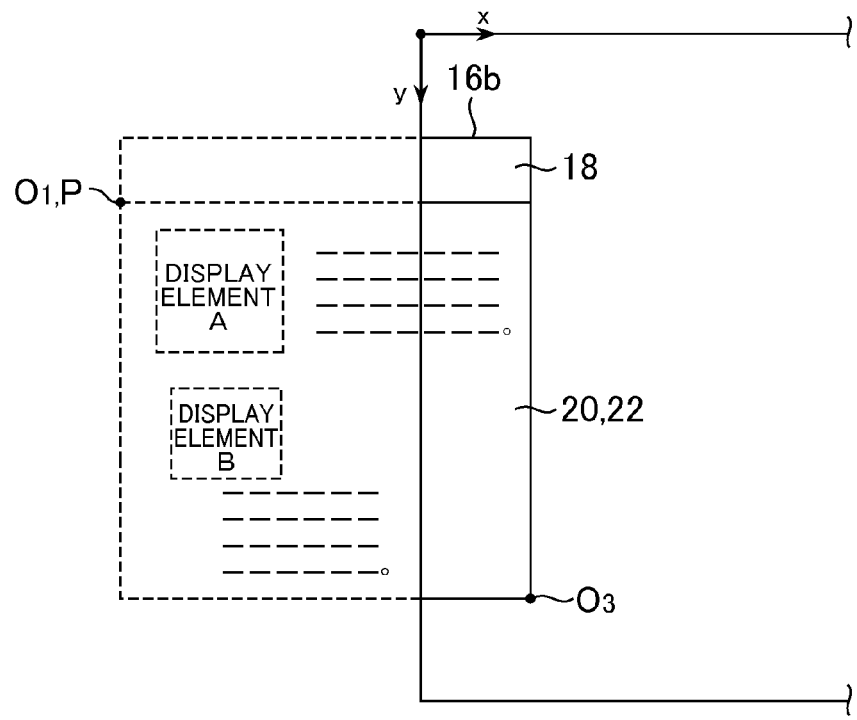
FIG. 7B is a diagram illustrating a transition of what is displayed on the screen.

FIG. 6, FIG. 7A, and FIG. 7B are diagrams illustrating a transition of what is displayed on the screen. In the service providing system 1 described above, when the window A whose place in priority order is "1" and the window B whose place in priority order is "2" are apart from each other (see FIG. 6) and the user moves the window A toward the window B, a part of the window B that is covered with the window A is no longer displayed on the screen and cannot be viewed. In this case, if the display element A and the display element B are located in the part covered with the window A, the screen no longer displays the display element A and the display element B as illustrated in FIG. 7A.

To give another example, a part of the window B that is pushed out of the screen as a result of the user moving the window B is no longer displayed and visible as illustrated in FIG. 7B. The part pushed out of the screen is represented by a part indicated by the dotted line. In this case, if the display element A and the display element B are located in the part pushed out of the screen, the screen no longer displays the display element A and the display element B.

The client PC 4 addresses this by taking an action described below when the display elements of the window B are not displayed on the screen for the reasons illustrated in FIGS. 7A and 7B.

The following description is about this point. A part of the Web page display target area 20 that is covered with another window or a part of the Web page display target area 20 that is pushed out of the screen is referred to as non-visible area. In the case of FIG. 7A, a rectangular-shaped area having the point $O_1$ as its upper left vertex and the lower right vertex of the window A as its lower right vertex qualifies as a non-visible area. The rest of the Web page display target area 20 which is a visible area remaining after excluding the non-visible area is referred to as actual display area.

Figure 8:
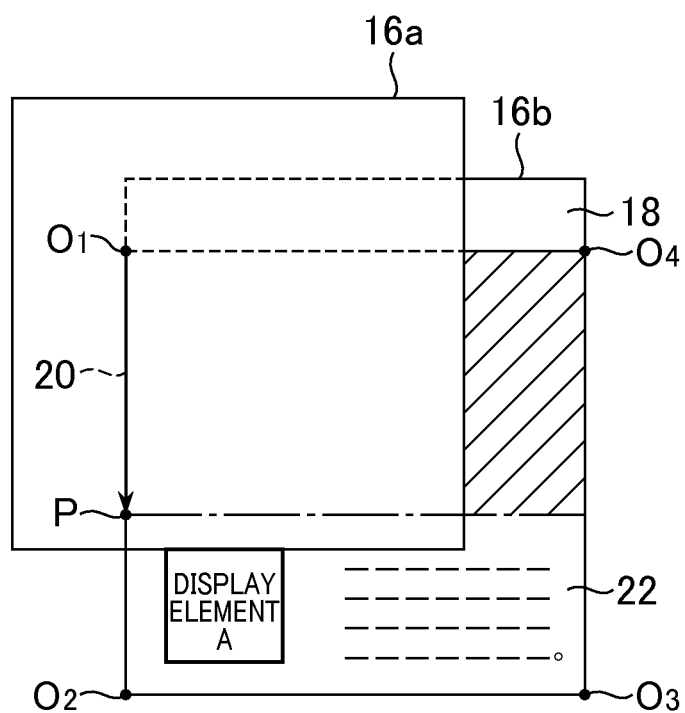
FIG. 8 is a diagram illustrating the window B.

In the case of FIG. 7A, the control unit 6 of the client PC 4 moves the reference point P so that the display element A which is higher in priority order than the display element B is displayed preferentially in the actual display area, without changing the layout of the Web page. FIG. 8 illustrates how the window B looks after the reference point P is moved downward (in the positive direction of the Y-axis).

Figure 9A:
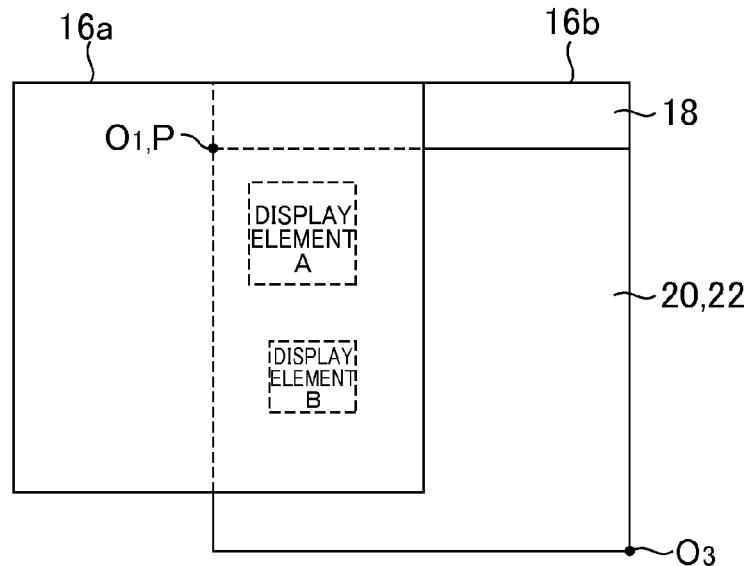
FIG. 9A is a diagram illustrating the window B.
Figure 9B:
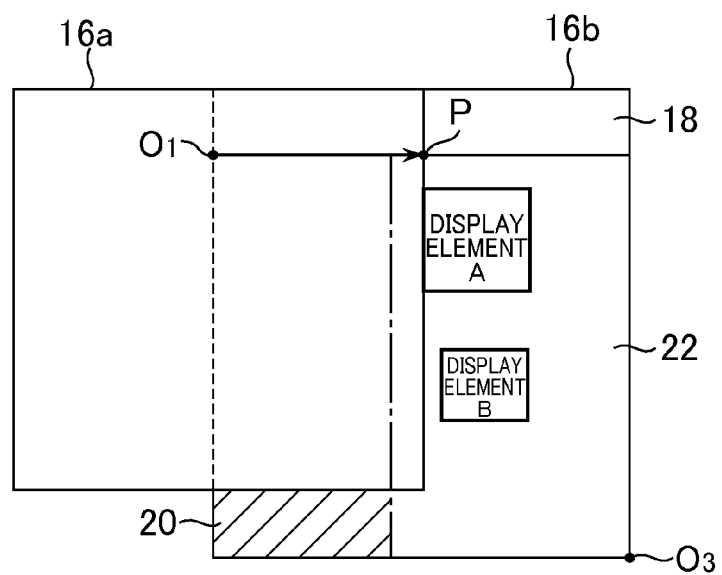
FIG. 9B is a diagram illustrating the window B.

Features of the client PC 4 are not limited to this. For instance, just displaying the display element A in the actual display area is achieved by simply moving the reference point P all the time as in FIG. 8. In the case of FIG. 9A, however, moving the reference point P downward does not help because there is no large enough space to contain the whole display element A due to the relation between the size and shape of the actual display area and the size and shape of the display element A, and the display element A in its current size cannot be displayed in the actual display area. The client PC 4 addresses this by moving the reference point P so that the display element A can be displayed in its current size in the actual display area. FIG. 9B illustrates how the window B looks after the reference point P is moved rightward (in the positive direction of the X-axis).

Figure 10:
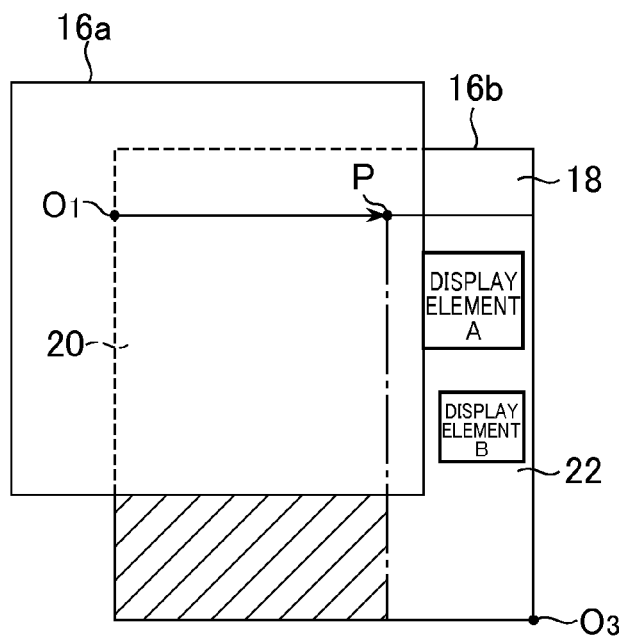
FIG. 10 is a diagram illustrating the window B.

The client PC 4 has more features. For instance, just displaying the display element A in the actual display area in the case of FIG. 7A is achieved by simply moving the reference point P rightward as illustrated in FIG. 10. In the case of FIG. 10, however, a hatched part (hereinafter referred to as blank area) generated by moving the reference point P is large and the Web page display target area 20 is not used efficiently. The client PC 4 addresses this by using the control unit 6 to move the reference point P in a manner that minimizes the planar dimensions of the blank area (the product of an increment in the X-coordinate of the reference point P and an increment in the Y-coordinate of the reference point P), which is generated by the moving of the reference point P.

Figure 11:
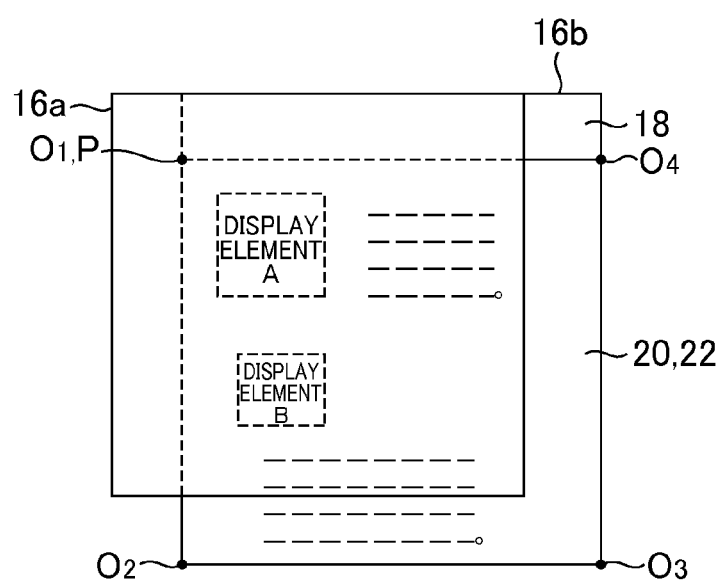
FIG. 11 is a diagram illustrating the window B.

The client PC 4 has still more features. For instance, in the case of FIG. 11 where a large enough space to contain the whole display element A is not found anywhere in the actual display area, the display element A cannot be displayed in its entirety in the actual display area no matter where the reference point P is moved.

Figures 12, 13:
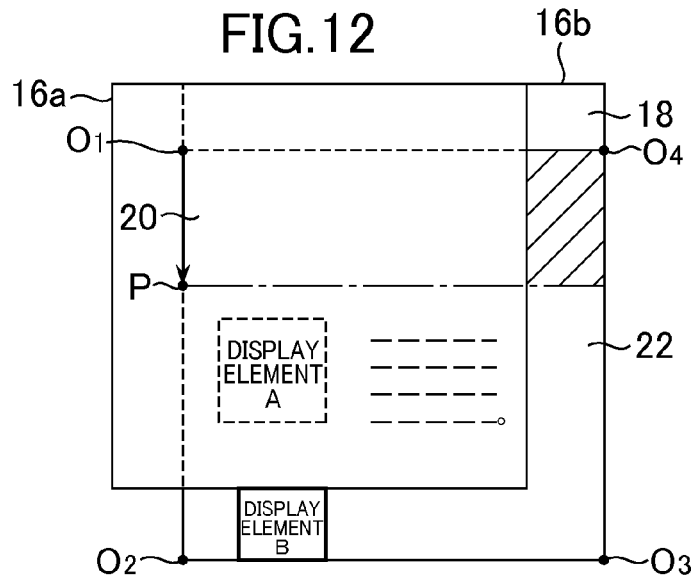
FIG. 12 is a diagram illustrating the window B.
FIG. 13 is a diagram illustrating an example of what is written in Web data.

The client PC 4 addresses this situation where the actual display area has no large enough space to contain the whole display element A by using the control unit 6 to move the reference point P so that one of display elements that are low in priority order relative to the display element A (here, the display element B which is one step lower) is displayed in the actual display area as illustrated in FIG. 12. In this case, too, the control unit 6 moves the reference point P in a manner that minimizes the planar dimensions of the blank area.

The description given below is about processing executed in the client PC 4. Web data for drawing a Web page in the drawing target area 22 is described first.

FIG. 13 is a diagram illustrating an example of what is written in HTML data that is the Web data. As illustrated in FIG. 13, an <html> tag and a </html> tag which indicate that the Web data is an HTML document are written in the Web data.

A <body> tag and a </body> tag are written as well. A script that is written by the service provider described above is written between the <body> tag and the </body> tag. The script is a script section for determining the reference point P. Information about the respective display elements (sources, display sizes, placement in the Web page, etc.), the places in priority order of the respective display elements, an algorithm for determining the reference point P, and the like are written in the script. The browser application (i.e., the control unit 6)

sequentially executes parsing processing and rendering processing based on the reference point P determined by the script. In the parsing processing, the control unit 6 uses a given parsing algorithm to calculate, for each display element, X- and Y-coordinate values indicating the drawing area (position) of the display element based on the coordinate values $(X_0, Y_0)$ of the reference point P and information about the display element. In the rendering processing, the Web page is drawn in the drawing target area 22 based on the result of the parsing.

Figure 14:
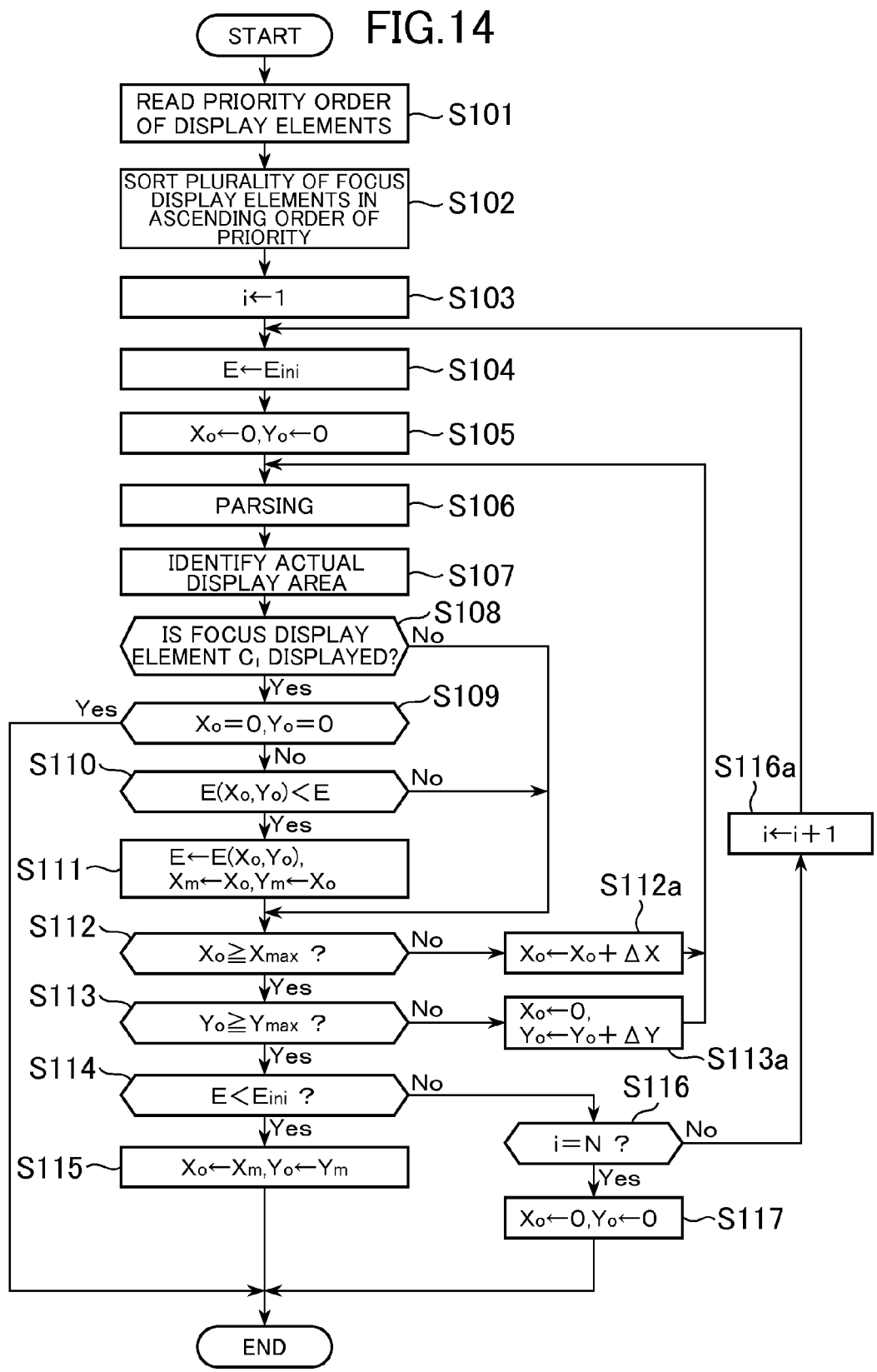
FIG. 14 is a flowchart illustrating an example of processing executed by a control unit.

FIG. 14 is a diagram exemplifying processing that is executed by the control unit 6, which operates as programmed by the browser application, by following the script in order to determine the reference point P. This processing is executed, when the client PC 4 receives the Web data, when the user operates one of the windows, when a given length of time elapses since the last execution of this processing, or the like.

The control unit 6 first reads the priority order of display elements that is written in the script section (S101), and sorts a plurality of focus display elements among these display elements by the order of priority (S102). A focus display element corresponds to a focus part. Each display element contained in the Web page is treated as a focus display element here. Alternatively, display elements that are the first to the n-th (n is 3, for example) in priority order may be selected as focus display elements. Each focus display element is hereinafter denoted by $C_i$ (i=1 to N). A smaller value of "i" indicates a higher place in priority order.

The control unit 6 (selecting means) selects the focus display element $C_i$ that is the highest in priority order (i=1) (S103), and sets an initial value $E_{ini}$ to an evaluation value E, which is stored in the memory unit 8 (S104). The value of $E_{ini}$ is set as the product of "$X_{max}$", which is the upper limit of "$X_0$", and "$Y_{max}$", which is the upper limit of "$Y_0$". The control unit 6 also sets the reference point P to the point $O_1$ (the initial position) (S105).

The control unit 6 (obtaining means) then executes the parsing processing described above (S106). Calculated by the parsing processing for each display element are X- and Y-coordinate values that indicate the drawing area of the display element.

The control unit 6 then identifies the actual display area (S107). In the case of the processing procedure of FIG. 14, the control unit 6 receives what is stored in the window management table from the operating system and, when a part of its own window is pushed out of the screen, calculates X- and Y-coordinate values indicating a part of the Web page display target area 20 that is not pushed out of the screen as X- and Y-coordinate values indicating the actual display area. For example, when the left edge of its own window is pushed out of the screen, in other words, when the x-coordinate value of the upper left vertex of its own window is less than "0", the control unit 6 calculates, based on the x-coordinate value of this vertex, the X-coordinate value of the left edge of the part of the Web page display target area 20 that is not pushed out of the screen (i.e., the actual display area), and calculates X- and Y-coordinate values indicating the actual display area based on the obtained X-coordinate value.

In the case where the left edge of its own window is not pushed out of the screen, when there are no windows that are higher in priority order than its own window, or there is a window that is higher in priority order than its own window but all of the vertices of its own window are not within the other window, the control unit 6 identifies X- and Y-coordinate values that indicate the Web page display target area 20 as those of the actual display area. On the other hand, when one of the vertices of its own window is within the other window, for example, the control unit 6 calculates X- and Y-coordinate values indicating a part of its window that is not covered with the other window as X- and Y-coordinate values indicating the actual display area. Specifically, when the upper left vertex, for example, of its own window is within the other window, the control unit 6 identifies the X- and Y-coordinate values of the lower right vertex of a part of the Web page display target area 20 that is covered with the other window based on the relation between the x- and y-coordinate values of the upper left vertex of its own window and the x- and y-coordinate values of the lower right vertex of the other window, and calculates X- and Y-coordinate values that indicate the actual display area based on the identified X- and Y-coordinate values.

The control unit 6 (exposure amount evaluating means) then determines whether or not the focus display element $C_i$ is displayed in the actual display area (S108). In other words, the control unit 6 determines whether or not the drawing area of the focus display element $C_i$ is contained in the actual display area. When the drawing area of the focus display element $C_i$ is contained in the actual display area, it is determined that the focus display element $C_i$ is displayed in the actual display area. When the drawing area of the focus display element $C_i$ is not contained in the actual display area, it is determined that the focus display element $C_i$ is not displayed in the actual display area.

"When the focus display element $C_i$ is displayed in the actual display area" may be defined as "when a given proportion $r_s$ or more of the drawing area of the focus display element $C_i$ is contained in the actual display area". "When the focus display element $C_i$ is not displayed in the actual display area" may be defined as "when less than the given proportion $r_s$ of the drawing area of the focus display element $C_i$ is contained in the actual display area".

In the case where the focus display element $C_i$ is displayed in the actual display area (Yes in S108) and the reference point P is not at the initial position (namely, the point $O_1$) (No in S109), the control unit 6 (blank area evaluating means) calculates the function value of a blank area evaluation function $E(X_0, Y_0)$ of "$X_0$" and "$Y_0$" for evaluating the planar dimensions of the blank area (see FIG. 8 and others). The function $E(X_0, Y_0)$ here is expressed as the product of "$X_0$" and "$Y_0$". The value of $E(X_0, Y_0)$ is smaller when the blank area has smaller planar dimensions. The control unit 6 (setting means) then determines whether or not the function value of $E(X_0, Y_0)$ is less than the evaluation value E stored in the memory unit 8 (S110).

When the function value of $E(X_0, Y_0)$ is less than the evaluation value E (Yes in S110), the control unit 6 (setting means) updates the evaluation value E with the function value of $E(X_0, Y_0)$ in order to minimize the planar dimensions of the blank area. The control unit 6 (setting means) also updates a candidate value "$X_m$" and a candidate value "$Y_m$" which are stored in the memory unit 8 with "$X_0$" and "$Y_0$", respectively (S111).

In the case where it is determined that the focus display element $C_i$ is not displayed in the actual display area (No in S108), the focus display element $C_i$ is not displayed in the actual display area with the reference point P at the current position, and the control unit 6 therefore proceeds to Step S112. Even when it is determined in Step S108 that the focus display element $C_i$ is displayed in the actual display area, if the function value of $E(X_0, Y_0)$ exceeds the evaluation value E (Yes in S110), the blank area does not have minimum planar dimensions with the reference point P at the current position, and the control unit 6 therefore proceeds to Step S112 as in the case where it is determined that the focus display element $C_i$ is not displayed in the actual display area.

In Steps S112 and S113, processing is executed in order to move the reference point P within the Web page display target area 20 along a travel path that follows the pattern of raster scanning. Specifically, the control unit 6 determines whether or not "$X_0$" is equal to or more than "$X_{max}$" (S112) and, when "$X_0$" is not equal to or more than "$X_{max}$" (No in S112), shifts the reference point P rightward by $\Delta X$ (S112a). In the case where "$X_0$" is equal to or more than "$X_{max}$" (Yes in S112), on the other hand, the control unit 6 determines whether or not "$Y_0$" is equal to or more than "$Y_{max}$" (S113) in order to determine whether the reference point P has reached the end of the travel path. When "$Y_0$" is not equal to or more than "$Y_{max}$" (No in S113), it means that the reference point P has not reached the end of the travel path yet. The control unit 6 therefore moves the reference point P to the left edge of the Web page display target area 20 while shifting the reference point P downward by $\Delta Y$ (S113a). Appropriate positive real numbers can be set to $\Delta X$ and $\Delta Y$.

In the case where "$Y_0$" is equal to or more than "$Y_{max}$" (Yes in S113), on the other hand, it means that the reference point P has reached the end of the travel path. The control unit 6 (setting means) therefore determines whether or not the evaluation value E is less than the initial value $E_{ini}$ ($=X_{max} \times Y_{max}$) (S114) in order to determine whether or not a candidate for the reference point P with which the focus display element $C_i$ can be displayed in the actual display area is found along the travel path. The evaluation value E being less than the initial value $E_{ini}$ means that a candidate for the reference point P with which the focus display element $C_i$ can be displayed in the actual display area is found along the travel path. The evaluation value E being equal to the initial value $E_{ini}$ means that such a candidate is not found along the travel path.

Accordingly, when the evaluation value E is less than the initial value $E_{ini}$ (Yes in S114), the control unit 6 (setting means) sets "$X_0$" to the candidate value "$X_m$" and sets "$Y_0$" to the candidate value "$Y_m$" (S115). The reference point P in this case is set to other positions than the point $O_1$.

In the case where the evaluation value E is equal to the initial value $E_{ini}$ (No in S114), on the other hand, there is no candidate for the reference point P with which the focus display element $C_i$ can be displayed in the actual display area, and the control unit 6 (selecting means) therefore determines whether or not the focus display element $C_i$ is the last focus display element $C_N$ (S116). When the focus display element $C_i$ is not the last focus display element $C_N$ (No in S116), the control unit 6 selects anew a focus display element that is next to the current focus display element $C_i$ as the new focus display element $C_i$ (S116a), and executes Step S104 and the subsequent steps again.

In the case where the focus display element $C_i$ is the focus display element $C_N$ (Yes in S116), on the other hand, no candidate is found along the travel path for the reference point P with which one of the focus display elements can be displayed in the actual display area, and the reference point P is therefore set to the point $O_1$ (S117).

After setting the reference point P through the processing of FIG. 14, the control unit 6 draws the Web page in the drawing target area 22.

This way, the display element A can be displayed in the actual display area in the manners illustrated in FIG. 8 and FIG. 12, for example. In short, the display element A can be displayed in the actual display area without changing the size. The display element A can also be displayed in the actual display area while the planar dimensions of the blank area are minimized.

Figure 15:
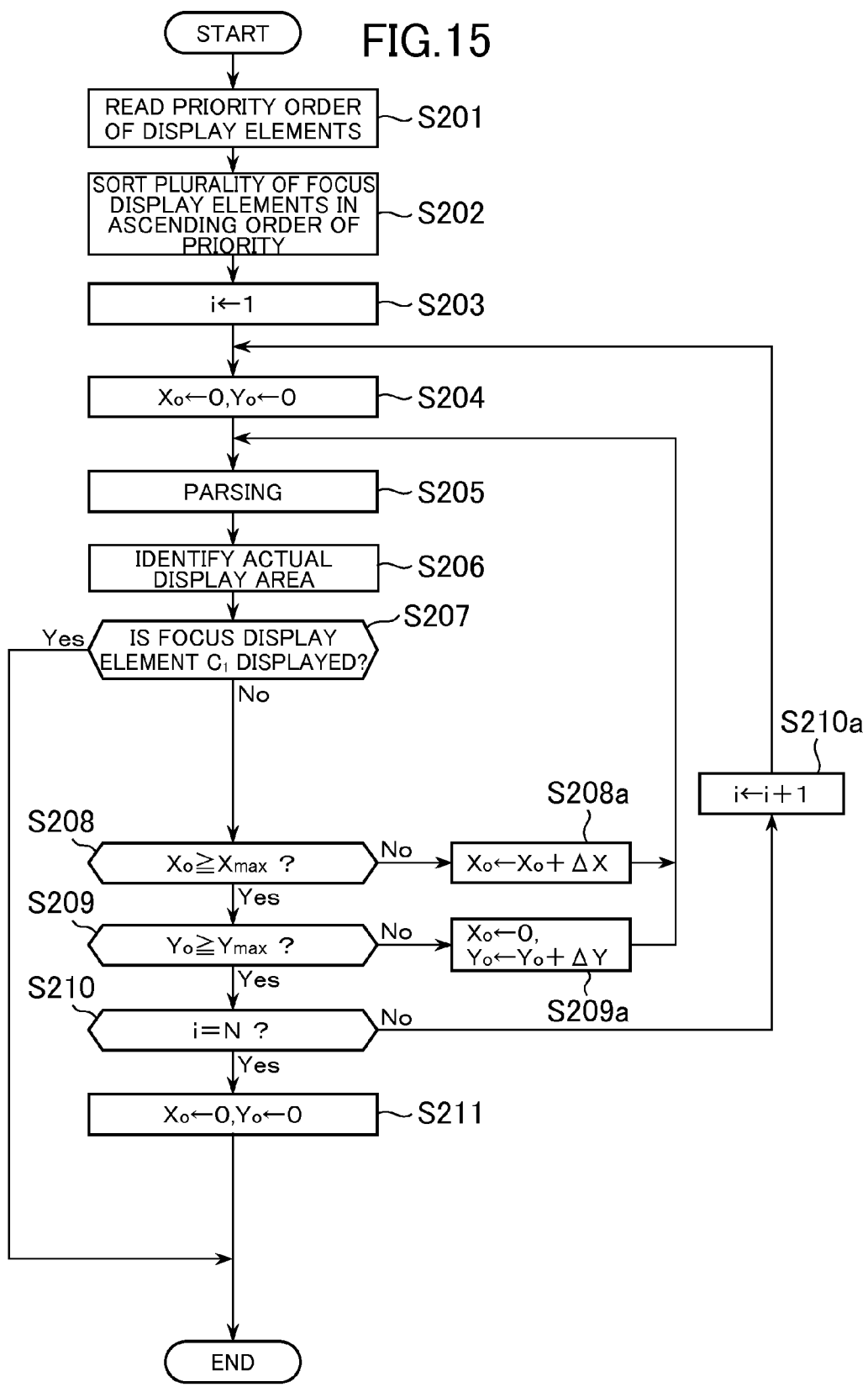
FIG. 15 is a flow chart illustrating another example of the processing executed by the control unit.

In the case where minimizing the planar dimensions of the blank area is not necessary, the control unit 6 may execute processing illustrated in FIG. 15 instead of the processing of FIG. 14. The processing of FIG. 15 is described below. The processing of FIG. 14 is hereinafter referred to as a first processing mode and the processing of FIG. 15 is hereinafter referred to as a second processing mode.

Specifically, the control unit 6 executes the same processing as Step S101 to obtain the priority order of display elements (S201). The control unit 6 also executes the same processing as Step S102 to sort a plurality of focus display elements in ascending order of priority (S202).

The control unit 6 selects one focus display element $C_i$ at a time the same way as in the first processing mode, and moves the reference point P from the point $O_1$ along the travel path described above to search for the position of the reference point P with which the focus display element $C_i$ can be displayed in the actual display area.

However, unlike the first processing mode, the processing in the second processing mode is ended at the time when it is determined that the focus display element $C_i$ is displayed in the actual display area, without calculating the function value of the blank area evaluation function $E(X_0, Y_0)$.

Specifically, the control unit 6 selects the focus display element $C_i$ that is the highest in priority order (i=1) as in Step S103 (S203). The control unit 6 then executes the same processing as Step S105 and sets the reference point P to the point $O_1$ (S204) without performing the same processing as S104.

The control unit 6 then executes the parsing processing (S205), the identifying of the actual display area (S206), and the determining of whether or not the focus display element $C_i$ is displayed in the actual display area (S207) as in the first processing mode.

When it is determined that the focus display element $C_i$ is not displayed in the actual display area (No in S207), the control unit 6 executes processing for moving the reference point P along the travel path (S208, S208a, S209, and S209a) as in the first processing mode.

In the case where it is determined that the focus display element $C_i$ is displayed in the actual display area (Yes in S207), on the other hand, the control unit 6 ends the processing at that point without performing the same processing as Steps S109 to S111.

In the case where the reference point P has reached the end of the travel path (Yes in S209), the control unit 6 determines whether or not the focus display element $C_i$ is the last focus display element $C_N$ (S210). When the focus display element $C_i$ is not the last focus display element $C_N$ (No in S210), the control unit 6 selects anew a focus display element that is next to the current focus display element $C_i$ as the new focus display element $C_i$ (S210a), and executes Step S204 and the subsequent steps again.

In the case where the focus display element $C_i$ is the focus display element $C_N$ (Yes in S210), on the other hand, no candidate is found along the travel path for the reference point P with which one of the focus display elements can be displayed in the actual display area, and the control unit 6 therefore sets the reference point P to the point $O_1$ (S211).

In the first processing mode and the second processing mode, the control unit 6 sets the reference point P by focusing only on the selected focus display element. The control unit 6 thus ensures that the selected focus display element is displayed in the actual display area. In the first processing mode and the second processing mode, attention is paid only to the selected focus display element and the presence of other focus display elements than the selected focus display element is not taken into consideration.

Figure 16:
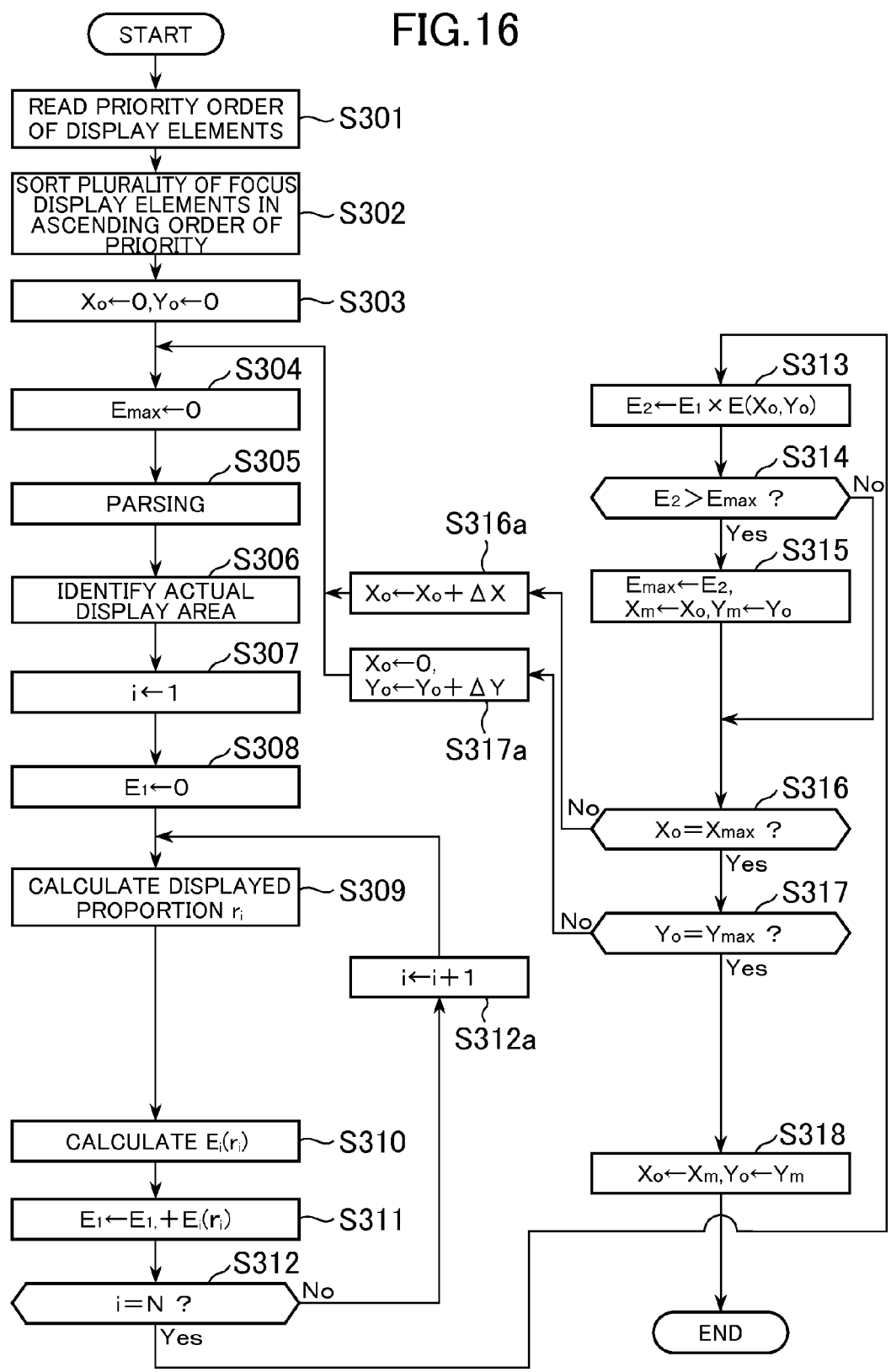
FIG. 16 is a flow chart illustrating still another example of the processing executed by the control unit.

Therefore, in order that as many focus display elements as possible can be displayed in the actual display area, the control unit 6 may execute processing illustrated in FIG. 16 (third processing mode) instead of the processing of FIG. 14. The third processing mode is described below.

First, the control unit 6 executes the same processing as Step S101 to obtain the priority order of display elements (S301). The control unit 6 then executes the same processing as Step S102 to sort the plurality of focus display elements in ascending order of priority (S302) and set the reference point P to the point $O_1$ (S303).

The control unit 6 then executes Steps S304 to S317a to evaluate each position along the travel path described above mainly from the viewpoint of how many focus display elements are displayed in the actual display area. The control unit 6 also identifies a position that has earned the highest evaluation by executing Steps S314 and S315, in particular.

Specifically, the control unit 6 initializes a maximum evaluation value $E_{max}$ with an initial value "0" (S304), and executes parsing processing (S305).

The control unit 6 then executes the same processing as Step S107 to identify the actual display area (S306), and selects the focus display element $C_i$ that is the highest in priority order (namely, $C_1$) (S307). The control unit 6 also initializes an evaluation value $E_1$ with the initial value "0" (S308).

The control unit 6 executes Steps S309 to S312a to calculate, for each focus display element $C_i$, an individual evaluation value $E_i(r_i)$, and calculates the evaluation value $E_1$ mentioned above, which is the sum of these individual evaluation values.

Specifically, the control unit 6 (exposure amount evaluating means) calculates a displayed proportion $r_i$ of the focus display element $C_i$ (S309). The displayed proportion $r_i$ here is the proportion of the planar dimensions of a part of a drawing area for the focus display element $C_i$ that is contained in the actual display area to the planar dimensions of this drawing area.

The control unit 6 then calculates the individual evaluation value $E_i(r_i)$ (S310). The individual evaluation value $E_i(r_i)$ here is the function value of the place in priority order "i" of the focus display element $C_i$ and the displayed proportion $r_i$ of the focus display element $C_i$. The individual evaluation value $E_i(r_i)$ in this embodiment is expressed by the following expression.

$$E_i(r_i)=0 \text{ (when } r_i<r_s \text{ is true)}$$

$$E_i(r_i)=(N+1-i)/N \text{ (when } r_i \geq r_s \text{ is true)}$$

The symbol $r_s$ represents a reference proportion, in this case, "1". Therefore, the function value of $E_i(r_i)$ is "0" unless the whole drawing area of the focus display element $C_i$ is contained in the actual display area. The individual evaluation value $E_i(r_i)$ may also be expressed by the following expression.

$$E_i(r_i)=((N+1-i)/N) \times r_i$$

The individual evaluation value $E_i(r_i)$ is a decreasing function of the place in priority order "i". The evaluation value $E_1$ is accordingly a decreasing function of the place in priority order "i" as well. The individual evaluation value $E_i(r_i)$ is an increasing function of the displayed proportion $r_i$ of the focus display element $C_i$. The evaluation value $E_1$ is accordingly an increasing function of the displayed proportion $r_i$ of the focus display element $C_i$ as well.

After calculating the individual evaluation value $E_i(r_i)$, the control unit 6 adds the calculated individual evaluation value $E_i(r_i)$ to the evaluation value $E_1$ (S311). When the focus display element $C_i$ is not the focus display element $C_N$ which is the lowest in priority order (No in S312), the control unit 6 selects a focus display element that is one step below the focus display element $C_i$ in priority order (S312a), and returns to Step S309.

After calculating the evaluation value $E_1$ (Yes in S312), the control unit 6 calculates a position evaluation value $E_2$, which indicates an evaluation of the current position (S313). A larger value of the position evaluation value $E_2$ indicates a higher evaluation. Specifically, the control unit 6 calculates the function value of a blank area evaluation function $E(X_0, Y_0)$ that differs from the one in the first processing mode, and calculates the product of the function value of the blank area evaluation function $E(X_0,Y_0)$ and the evaluation value $E_1$ as the position evaluation value $E_2$. The blank area evaluation function $E(X_0,Y_0)$ here is expressed by the following expression.

$$E(X_0,Y_0)=((X_{max} \times Y_{max})-(X_0 \times Y_0))/(X_{max} \times Y_{max})$$

The value of "$X_0 \times Y_0$" is smaller when the blank area has smaller planar dimensions as described above. The function value of the blank area evaluation function $E(X_0,Y_0)$ is therefore larger when the blank area has smaller planar dimensions. The position evaluation value $E_2$, which is an increasing function of the function value of the blank area evaluation function $E(X_0,Y_0)$, accordingly yields a higher evaluation when the blank area has smaller planar dimensions.

The evaluation value $E_1$ is an increasing function of the displayed proportion $r_i$ of the focus display element $C_i$ as described above. The position evaluation value $E_2$ is therefore an increasing function of the displayed proportion $r_i$ of the focus display element $C_i$ as well. Accordingly, the position evaluation value $E_2$ indicates a higher evaluation when more focus display elements are displayed in the actual display area. The evaluation value $E_1$ is a decreasing function of the place in priority order "i", and the position evaluation value $E_2$ is therefore a decreasing function of the place in order of priority "i" as well. The position evaluation value $E_2$ of a focus display element that is displayed in the actual display area is accordingly higher when the focus display element is higher in priority order.

The control unit 6 (setting means) then determines whether or not the position evaluation value $E_2$ is larger than the maximum evaluation value $E_{max}$ (S314). When the position evaluation value $E_2$ is equal to or less than the maximum evaluation value $E_{max}$ (No in S314), the control unit 6 proceeds to Step S316 in order to move the reference point. In the case where the position evaluation value $E_2$ is larger than the maximum evaluation value $E_{max}$ (Yes in S314), on the other hand, the control unit 6 updates the maximum evaluation value $E_{max}$ with the position evaluation value $E_2$, and sets the candidate value "$X_m$" and the candidate value "$Y_m$" to "$X_0$" and "$Y_0$", respectively (S315), and then proceeds to Step S316.

In Steps S316 to S317a, processing for moving the reference point P is performed. Specifically, the control unit 6 determines whether or not "$X_0$" is equal to or more than the "$X_{max}$" (S316), and shifts the reference point P rightward by $\Delta X$ when "$X_0$" is not equal to or more than "$X_{max}$" (No in S316). In the case where "$X_0$" is equal to or more than "$X_{max}$" (Yes in S316), on the other hand, the control unit 6 determines whether or not "$Y_0$" is equal to or more than "$Y_{max}$" (S317) in order to determine whether or not the reference point P has reached the end of the travel path. When "$Y_0$" is not equal to or more than "$Y_{max}$" (No in S317), it means that the reference point P has not reached the end of the travel path yet. The control unit 6 therefore moves the reference point P to the left edge of the Web page display target area 20 while shifting the reference point P downward by ΔY (S317a). Appropriate positive real numbers can be set to ΔX and ΔY.

When the reference point P reaches the end of the travel path (Yes in S317), the control unit 6 (setting means) sets a position $(X_m, Y_m)$ as the reference point P in order to set a position that has earned the highest evaluation as the reference point P (S318).

A higher evaluation is given when more focus display elements are displayed in the actual display area as described above. Therefore, as many focus display elements as possible can be displayed in the actual display area according to the third processing mode. In addition, a higher evaluation is given when a focus display element displayed in the actual display area is higher in priority order as described above. The third processing mode therefore makes it possible to preferentially display focus display elements that are high in priority order in the actual display area. The third processing mode can also reduce the blank area because a higher evaluation is given when the blank area has smaller planar dimensions as described above.

In the third processing mode, too, the display element A can be displayed in the actual display area in the manners illustrated in FIG. 8 and FIG. 12 as in the first processing mode. In this case, the definitional expressions of the individual evaluation value $E_i(r_i)$ and the blank area evaluation function $E(X_0, Y_0)$ are set accordingly.

How the present invention is carried out is not limited to the embodiment described above.

For instance, the "window" in the embodiment described above is not limited to the window B of the browser application, and can be a window of any type of application. A window of a document application, for example, may correspond to the "window".

Figure 17:
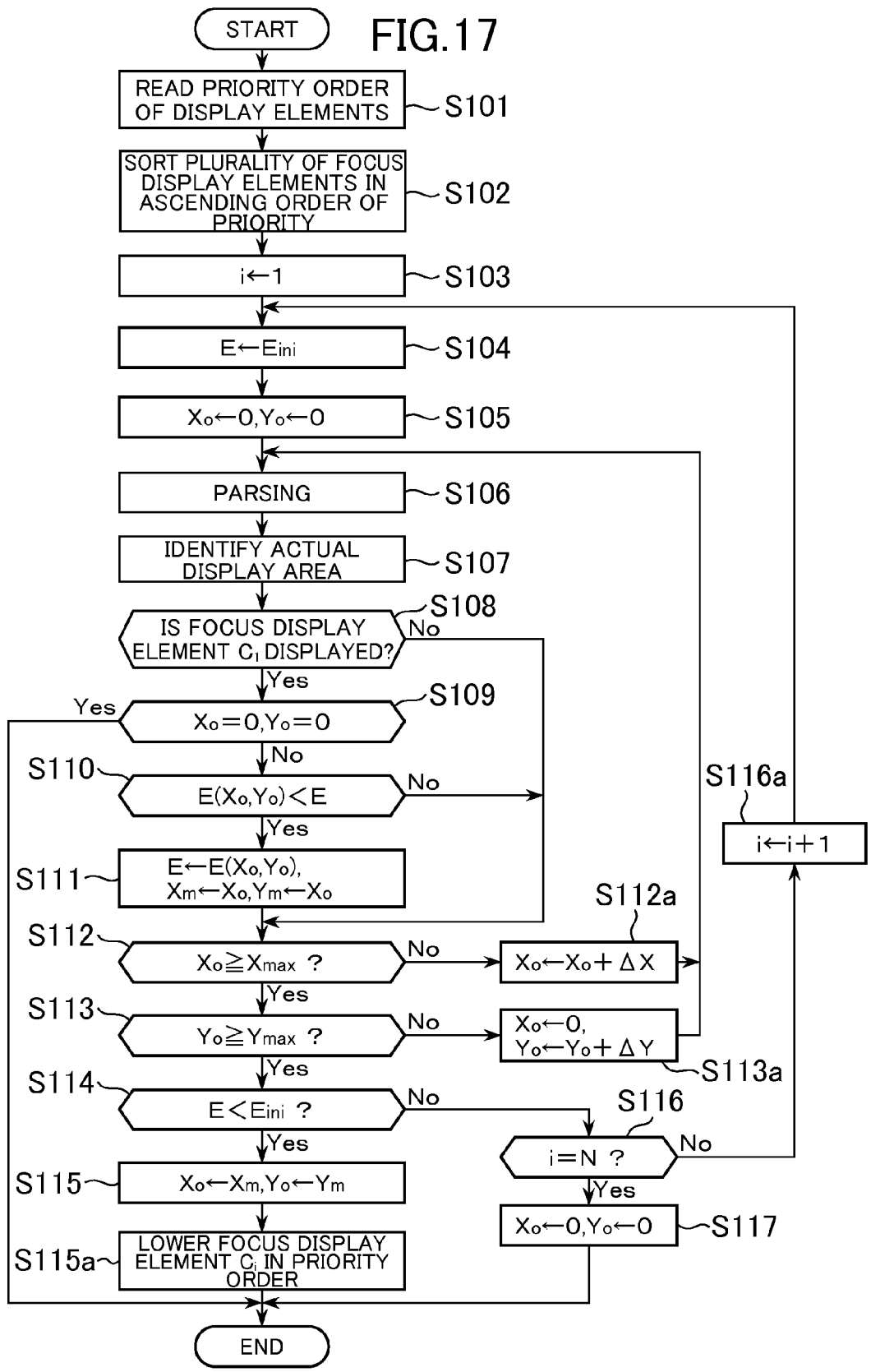
FIG. 17 is a flow chart illustrating still another example of the processing executed by the control unit.
Figure 18:
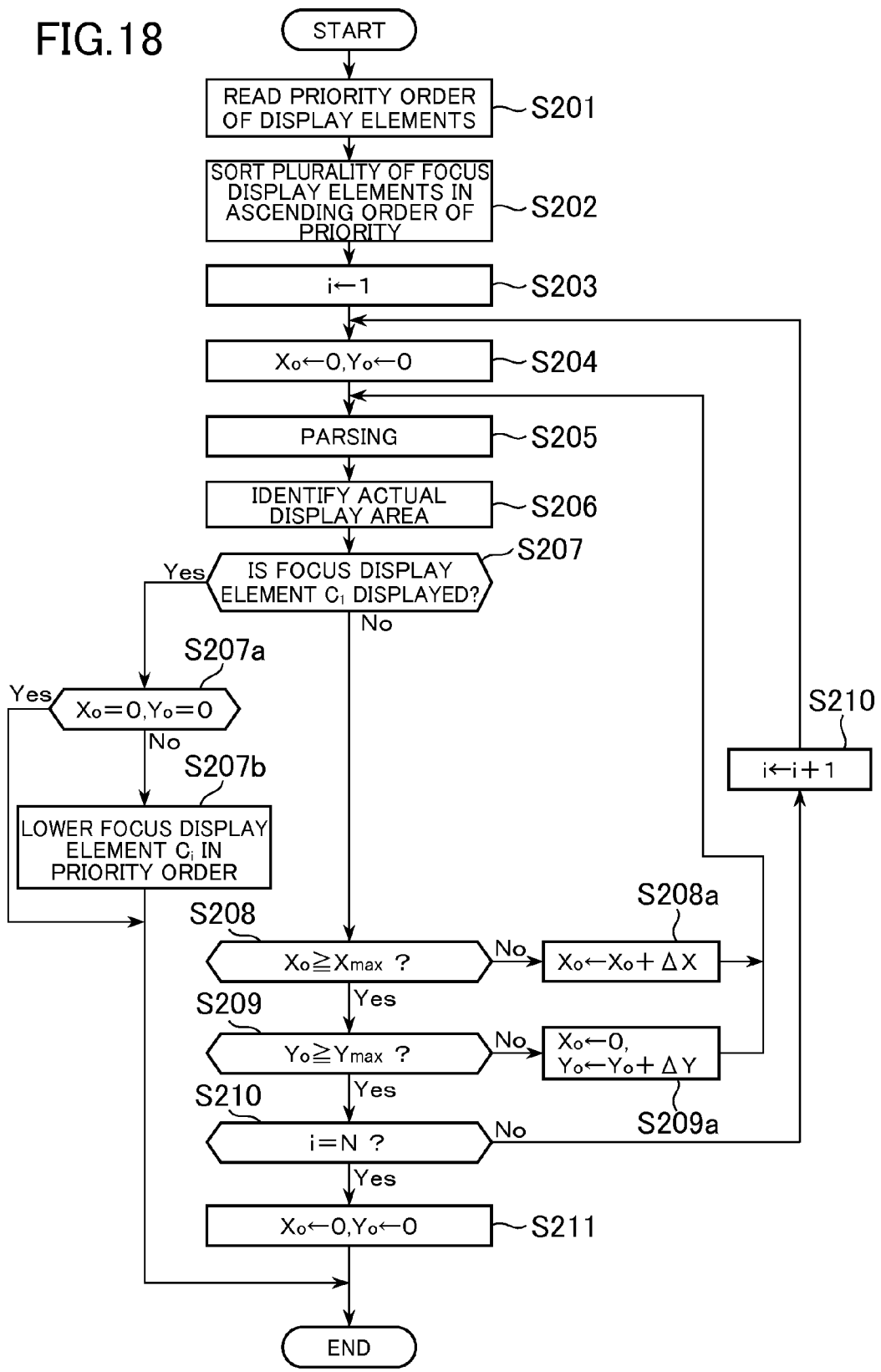
FIG. 18 is a flow chart illustrating still another example of the processing executed by the control unit.

For instance, the control unit 6 may assign a lower place in priority order to a focus display element that is displayed in the actual display area when the reference point P is set, in the case where the reference point P is set to other positions than the point $O_1$. This enables the information processing device to avoid keeping displaying only a particular focus part (for example, a focus display element that is high in priority order) preferentially in the actual display area. This is accomplished in the first processing mode by the control unit 6 by executing the following processing after Step S115. Specifically, after Step S115, the control unit 6 lowers the focus display element $C_i$ in priority order as illustrated in FIG. 17 (S115a). In the second processing mode, the control unit 6 executes the following processing when it is determined that the focus display element $C_i$ is displayed (Yes in S207). Specifically, the control unit 6 determines whether or not the reference point P is the point $O_1$ (S207a) and, when the reference point P is not the point $O_1$ (No in S207a), lowers the focus display element $C_i$ in priority order (S207b) as illustrated in FIG. 18.

Figure 19:
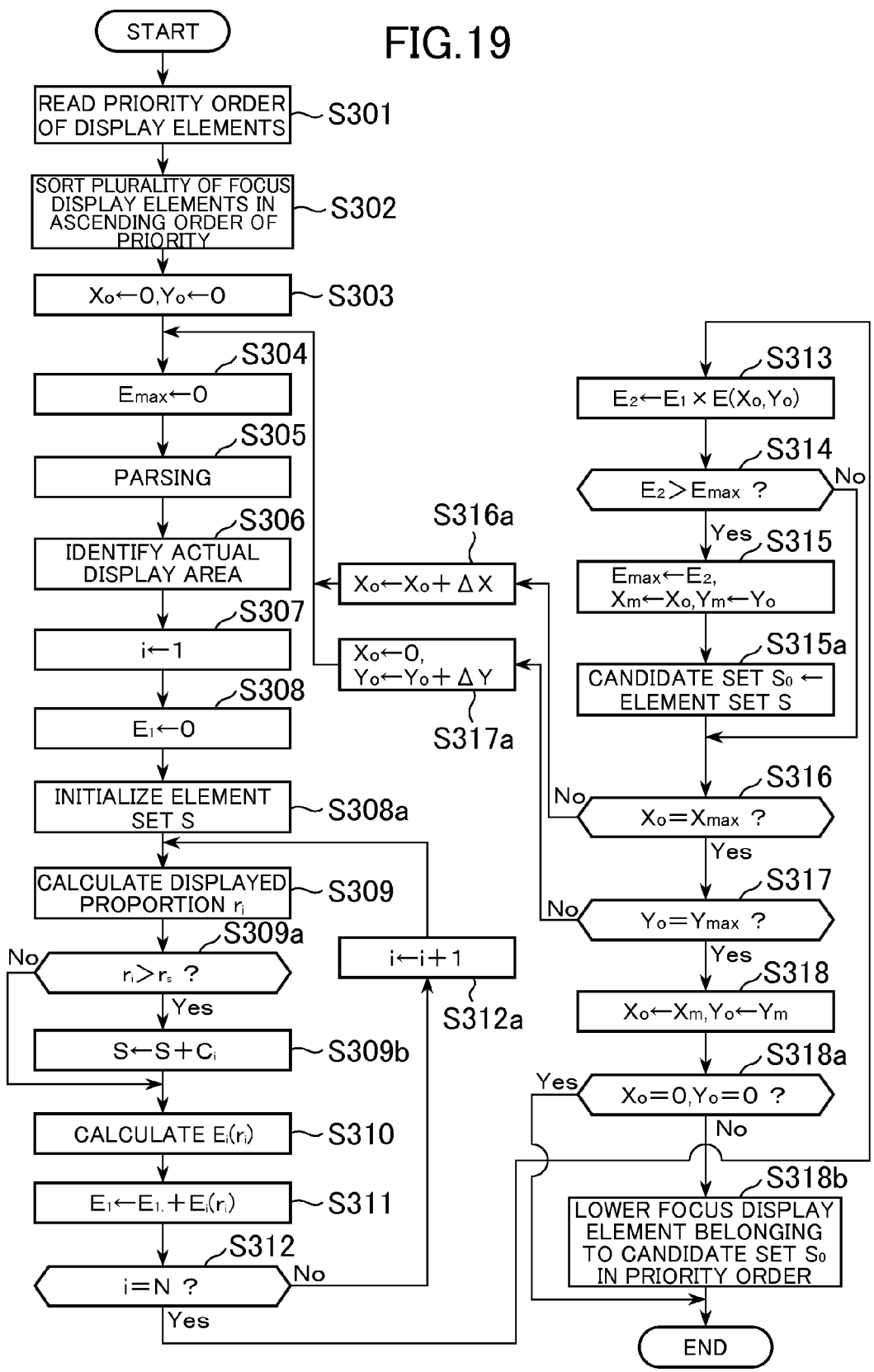
FIG. 19 is a flow chart illustrating still another example of the processing executed by the control unit.

In the third processing mode, the control unit 6 additionally performs the following processing. Specifically, the control unit 6 initializes an element set S with an empty set (S308a) after Step S308 as illustrated in FIG. 19. After calculating the displayed proportion $r_i$ in Step S309, the control unit 6 determines whether or not the displayed proportion $r_i$ is equal to or more than the reference proportion $r_s$ (S309a). When the displayed proportion $r_i$ is equal to or more than the reference proportion $r_s$ (Yes in S309a), the control unit 6 adds the focus display element $C_i$ to the element set S (S309b). When the position evaluation value $E_2$ exceeds the maximum evaluation value $E_{max}$ (Yes in S314), the control unit 6 sets the element set S as a candidate set $S_0$ (S315a) in addition to executing Step S315. The control unit 6 sets the reference point P in Step S318, and determines whether or not the set reference point P is the point $O_1$ (S318a). When the reference point P is not the point $O_1$ (No in S318a), the control unit 6 assigns a lower place in priority order to a focus display element that belongs to the candidate set $S_0$ (S318b).

The invention claimed is:

1. An information processing device, comprising:
   at least one processor;
   at least one memory device that store a plurality of instructions, which when executed by the at least one processor, causes the at least one processor to operate to:
   obtain positions in a display target area of display elements of an object, the display target area being within a window, the window being at least partly displayed on a screen, wherein the object is drawn, or is to be drawn, in a drawing target area of the display target area, the drawing target area being at least part of the display target area and being defined by a reference point within the display target area, the object comprising a plurality of the display elements;
   identify an actual display area, which is a part of the display target area that is visible on the screen;
   set a reference point position of the reference point so that the display elements are displayed in the actual display area, based on the obtained position of the display elements and the identified actual display area;
   evaluate, for each of the plurality of display element positions, an amount of exposure of each of the display elements in the actual display area;
   obtain display element positions of the display elements in the display target area for each of a plurality of reference point positions; and
   set the reference point position based on the result of the evaluation of the exposure amount for each of the display elements,
   wherein the layout of the object is unchanged by the setting of the reference point position.

2. The information processing device according to claim 1, wherein, when it is determined that a position of the display element is not contained in the actual display area due to a position of the window in the screen, the processor is further operable to set the reference point position so that the display element is displayed in the actual display area, based on the obtained position of the display element and the identified actual display area.

3. The information processing device according to claim 1, wherein the processor is further operable to: evaluate, for each of the plurality of display element positions, an amount of a blank area in the actual display area that is generated, and set the reference point based on the result of the evaluation of the exposure amount evaluation and the blank area evaluation for each of the plurality of positions.

4. The information processing device according to claim 1, wherein a place in priority order is set for each of the display elements, and
   wherein the processor is further operable to set the reference point position based on the evaluation result of the exposure amount of each display element obtained for each of the plurality of reference point positions, and on the place in priority order of each display element.

5. The information processing device according to claim 4, when the reference point is set to positions different than an initial position of the reference point, the processor is further operable to assign a lower place in the priority order to the display element that is displayed in the display target area when the reference point is set.

6. The information processing device according to claim 1,
wherein a place in priority order is set for each of the display elements,
wherein the processor is further operable to:
select one of the plurality of the display elements based on the priority order,
obtain a display element position of the selected one of the plurality of the display elements in the display target area for each of the plurality of positions is set as the reference point, and
evaluate, for each of the plurality of display element positions, an amount of exposure of the selected one of the plurality of the display elements.

7. The information processing device according to claim 6, wherein when an evaluation result obtained for each of the plurality of display element positions satisfies a given condition, the processor is further operable to restrict the setting of the reference point, based on the evaluation result, and selects another display element anew based on the priority order.

8. The information processing device according to claim 7, when the reference point is set to positions different than an initial position of the reference point, the processor is further operable to assign a lower place in the priority order to the display element that is displayed in the display target area when the reference point is set.

9. The information processing device according to claim 6, when the reference point is set to positions different than an initial position of the reference point, the processor is further operable to assign a lower place in the priority order to the display element that is displayed in the display target area when the reference point is set.

10. A method of controlling an information processing device, comprising:
obtaining positions in a display target area of display elements of an object, the display target area being within a window, the window being at least partly displayed on a screen, wherein the object is drawn, or is to be drawn, in a drawing target area of the display target area, the drawing target area being at least part of the display target area and being defined by a reference point within the display target area, the object comprising a plurality of the display elements;
identifying an actual display area, which is a part of the display target area that is visible on the screen;
setting a reference point position of the reference point so that the display elements are displayed in the actual display area, based on the obtained position of the display elements and the identified actual display area;
evaluating, for each of the plurality of display element positions, an amount of exposure of each of the display elements in the actual display area;
obtaining display element positions of the display elements in the display target area for each of a plurality of reference point positions; and
setting the reference point position based on the result of the evaluation in the exposure amount evaluation step for each of the display elements,
wherein the layout of the object is unchanged by the setting of the reference point position.

* * * * *